United States Patent
Bently et al.

[11] Patent Number: 6,142,672
[45] Date of Patent: *Nov. 7, 2000

[54] FLUID FLOW AND CONTROL SYSTEM FOR A HYDROSTATIC BEARING SUPPORTING ROTATING EQUIPMENT: METHOD AND APPARATUS

[75] Inventors: Donald E. Bently; John W. Grant, both of Minden, Nev.

[73] Assignee: Bently Nevada Corporation, Minden, Nev.

[*] Notice: This patent is subject to a terminal disclaimer.

[21] Appl. No.: 09/102,498

[22] Filed: Jun. 22, 1998

[51] Int. Cl.$^7$ .................................................... F16C 32/06

[52] U.S. Cl. ........................................... 384/118; 384/448

[58] Field of Search .................................. 384/118, 116, 384/114, 111, 107, 448

[56] References Cited

U.S. PATENT DOCUMENTS

| | | |
|---|---|---|
| 2,459,826 | 1/1949 | Martellotti . |
| 2,578,712 | 12/1951 | Martellotti . |
| 2,578,713 | 12/1951 | Martellotti . |
| 2,692,803 | 10/1954 | Gerard . |
| 2,879,113 | 3/1959 | DeHart . |
| 2,938,756 | 5/1960 | Loeb . |
| 3,023,782 | 3/1962 | Chaves, Jr. et al. . |
| 3,053,589 | 9/1962 | Cameron . |
| 3,228,423 | 1/1966 | Moog, Jr. . |
| 3,271,086 | 9/1966 | Deffrenne . |
| 3,357,759 | 12/1967 | Stephenson . |
| 3,395,952 | 8/1968 | Deffrenne . |
| 3,403,948 | 10/1968 | Deffrenne . |
| 3,432,213 | 3/1969 | Adams . |
| 3,442,560 | 5/1969 | De Gast . |
| 3,588,202 | 6/1971 | Johnson . |
| 3,617,102 | 11/1971 | Wada et al. . |
| 3,658,393 | 4/1972 | Luthi . |
| 3,742,653 | 7/1973 | Kano et al. . |
| 3,749,456 | 7/1973 | Whitaker . |
| 4,035,037 | 7/1977 | Cunningham . |
| 4,193,644 | 3/1980 | Miyashita et al. . |
| 4,215,903 | 8/1980 | Andrews . |
| 4,327,592 | 5/1982 | Fincke . |
| 4,351,574 | 9/1982 | Furukawa et al. . |
| 4,504,048 | 3/1985 | Shiba et al. . |
| 4,512,671 | 4/1985 | Giers et al. . |
| 4,569,562 | 2/1986 | Sato et al. . |
| 4,630,942 | 12/1986 | Tsumaki et al. . |
| 4,643,592 | 2/1987 | Lewis et al. . |
| 4,650,123 | 3/1987 | Ooishi . |
| 4,685,813 | 8/1987 | Moog . |
| 4,696,585 | 9/1987 | Swearingen . |
| 4,704,879 | 11/1987 | Christ et al. . |
| 4,767,223 | 8/1988 | Goodwin . |
| 4,834,559 | 5/1989 | Kalvoda . |
| 4,944,609 | 7/1990 | Salter, Jr. et al. . |
| 4,947,639 | 8/1990 | Hibner et al. . |
| 5,033,317 | 7/1991 | Van Haag . |
| 5,034,639 | 7/1991 | Huss et al. . |
| 5,063,322 | 11/1991 | Sugita et al. . |
| 5,064,297 | 11/1991 | Tanaka et al. . |
| 5,066,197 | 11/1991 | Champagne . |
| 5,099,966 | 3/1992 | Wöhrl . |
| 5,104,237 | 4/1992 | Slocum . |
| 5,121,341 | 6/1992 | McCabria et al. . |
| 5,149,206 | 9/1992 | Bobo . |
| 5,197,807 | 3/1993 | Kuznar . |
| 5,201,585 | 4/1993 | Gans et al. . |
| 5,203,762 | 4/1993 | Cooperstein . |
| 5,219,447 | 6/1993 | Arvidsson . |
| 5,238,308 | 8/1993 | Lang et al. . |
| 5,281,032 | 1/1994 | Slocum . |

(List continued on next page.)

FOREIGN PATENT DOCUMENTS

| 0045110 | 5/1986 | Japan . |
|---|---|---|
| 2121892 | 1/1984 | United Kingdom . |

*Primary Examiner*—Lenard A. Footland
*Attorney, Agent, or Firm*—Dennis DeBoo

[57] ABSTRACT

A fluid flow control system for a bearing supporting rotating equipment, method and apparatus is disclosed in which a rotating shaft is suspended in a fluid. Shaft precession is monitored to provide a compensatory feed back loop to maintain proper shaft registry in the face of loads.

31 Claims, 14 Drawing Sheets

U.S. PATENT DOCUMENTS

| | | |
|---|---|---|
| 5,344,239 | 9/1994 | Stallone et al. . |
| 5,356,225 | 10/1994 | Hanes et al. . |
| 5,360,273 | 11/1994 | Buckmann . |
| 5,364,190 | 11/1994 | Ochiai et al. . |
| 5,374,129 | 12/1994 | Vohr et al. . |
| 5,385,171 | 1/1995 | Cleasby . |
| 5,391,002 | 2/1995 | Eigenbrod . |
| 5,447,375 | 9/1995 | Ochiai et al. . |
| 5,452,735 | 9/1995 | Gamble et al. . |
| 5,484,208 | 1/1996 | Kane et al. . |
| 5,769,545 | 6/1998 | Bently et al. ........................... 384/118 |

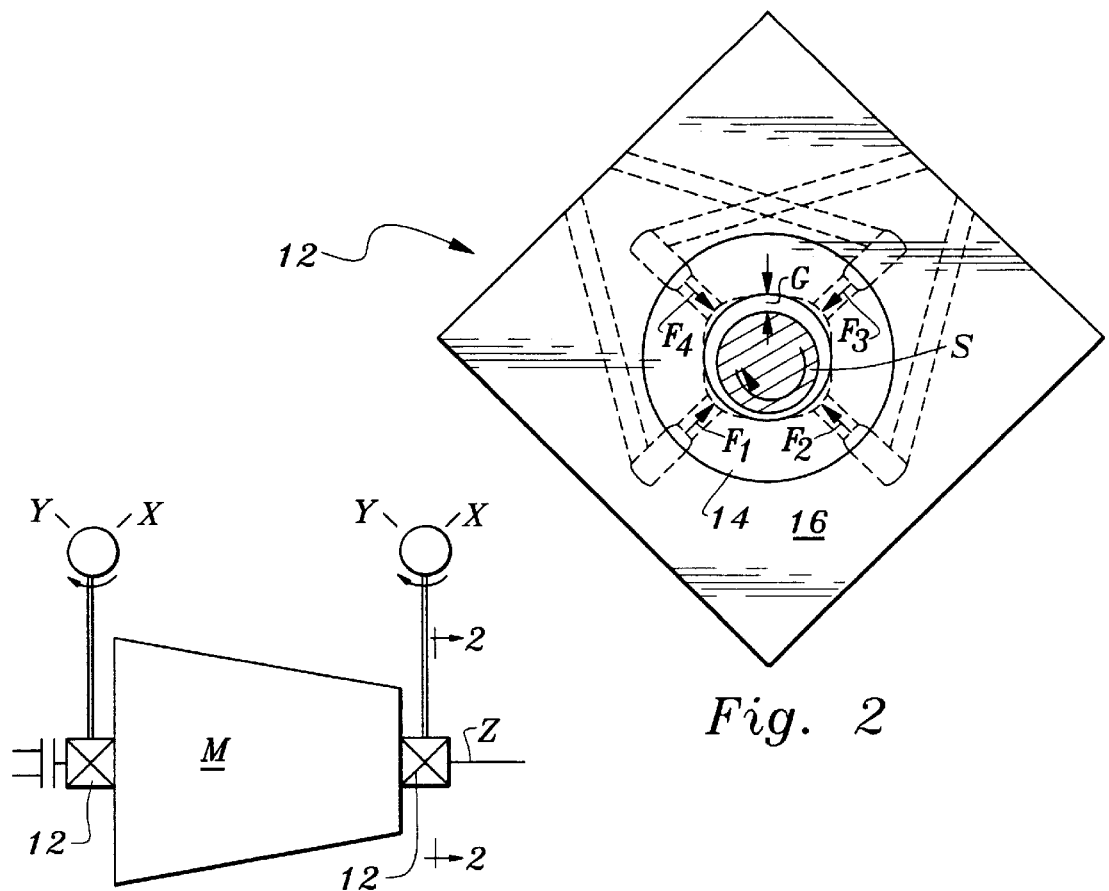
Fig. 2
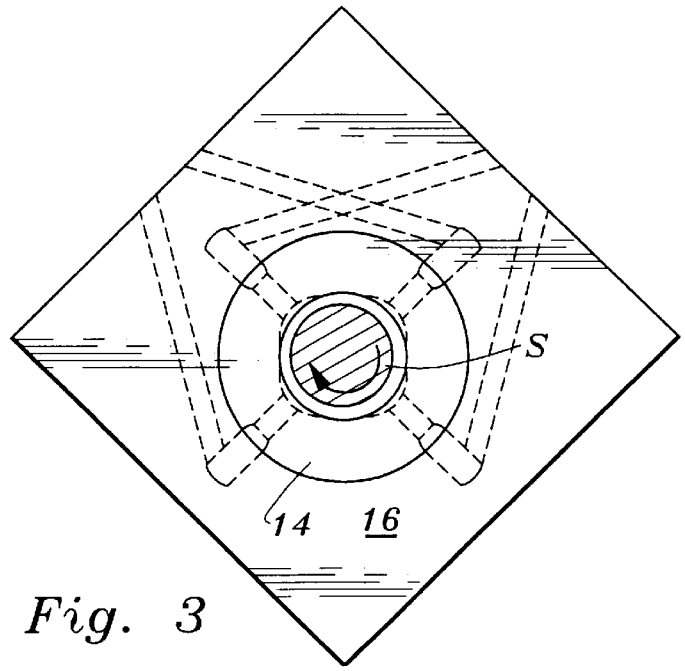
Fig. 1
Fig. 3

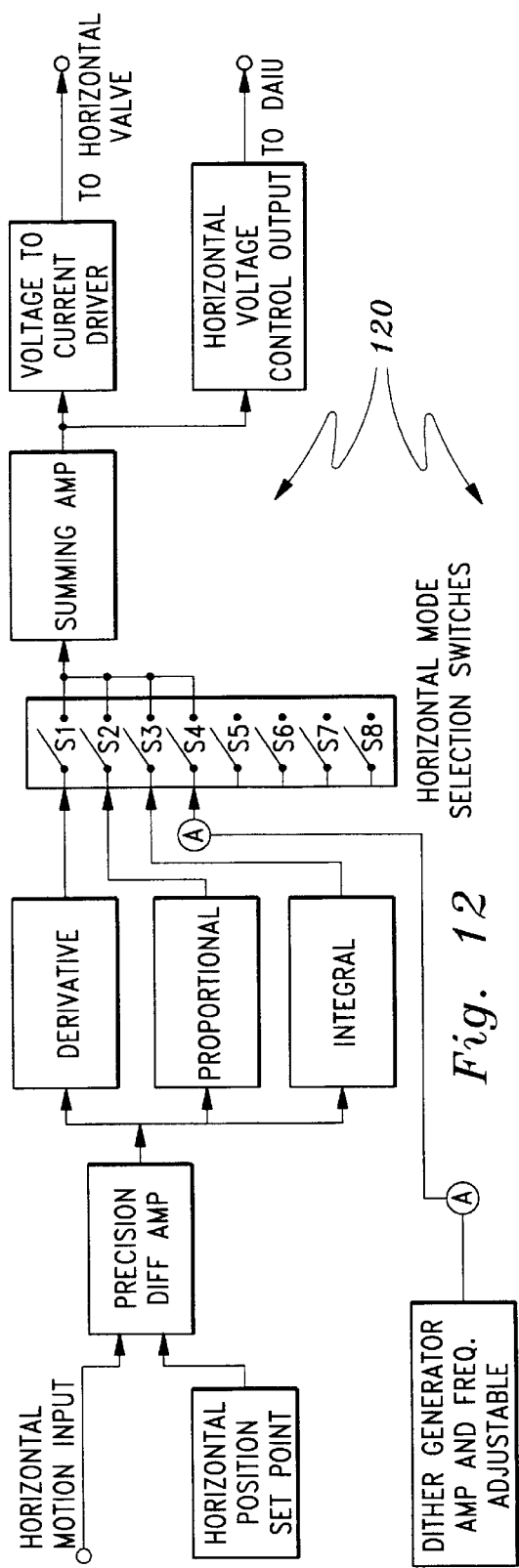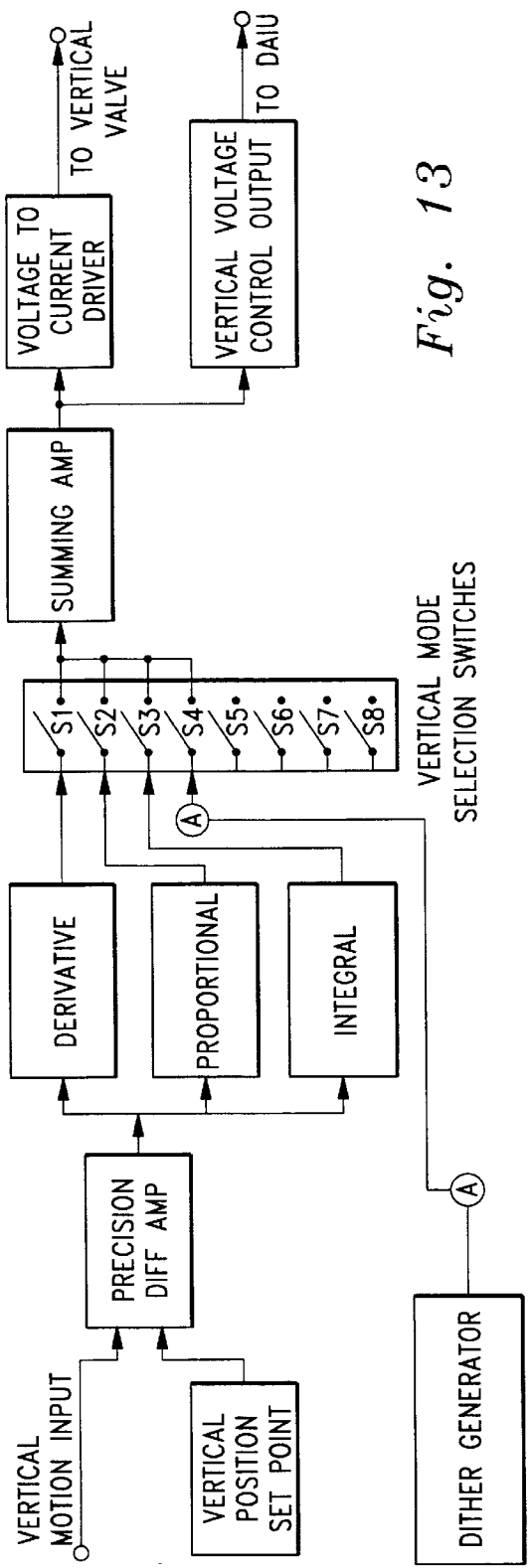
Fig. 12
Fig. 13

FLUID FLOW AND CONTROL SYSTEM FOR A HYDROSTATIC BEARING SUPPORTING ROTATING EQUIPMENT: METHOD AND APPARATUS

FIELD OF THE INVENTION

This invention relates generally to instrumentalities which support rotating equipment especially on a shaft. More specifically, the instant invention is directed to a fluid bearing that supports a variable speed rotating shaft where the bearing is fed fluid via a fluid flow system to maintain the shaft clearance with respect to stationary parts. The invention includes a control system operatively coupled between the shaft and the fluid flow system for dynamically aligning and balancing the shaft motion within the fluid bearing as a function of static and dynamic loading.

BACKGROUND OF THE INVENTION

Variable or constant speed rotating equipment, particularly equipment exposed to hostile environments and cycling or impulse loads, have heretofore not been able to benefit from bearing supports which can statically and dynamically compensate for impending rotor motion leading to rubbing of rotating and stationary parts. Further, those impulses which provide intermittent or constant loads on the bearing supports and other anomalous loadings such as bearing loading due to forces imposed by movement of the axis of rotation cannot be addressed by a "slowly responding" bearing.

While most bearings rely on a thin film of lubricant between rotating elements such as a ball bearing assembly, hydrodynamic bearings and magnetic bearings, some attempts have been made to allow shafts to be supported exclusively by hydrostatic fluid force.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
|---|---|---|
| U.S. PATENT DOCUMENTS | | |
| 2,459,826 | January 25, 1949 | Martellotti |
| 2,578,712 | December 18, 1951 | Martellotti |
| 2,578,713 | December 18, 1951 | Martellotti |
| 2,692,803 | October 26, 1954 | Gerard |
| 2,879,113 | March 24, 1959 | DeHart |
| 2,938,756 | May 31, 1960 | Loeb |
| 3,053,589 | September 11, 1962 | Cameron |
| 3,271,086 | September 6, 1966 | Deffrenne |
| 3,357,759 | December 12, 1967 | Stephenson |
| 3,395,952 | August 6, 1968 | Deffrenne |
| 3,403,948 | October 1, 1968 | Deffrenne |
| 3,432,213 | March 11, 1969 | Adams |
| 3,442,560 | May 6, 1969 | De Gast |
| 3,588,202 | June 28, 1971 | Johnson |
| 3,617,102 | November 2, 1971 | Wada, et al. |
| 3,658,393 | April 25, 1972 | Luthi |
| 3,742,653 | July 3, 1973 | Kano, et al. |
| 3,749,456 | July 31, 1973 | Whitaker |
| 4,035,037 | July 12, 1977 | Cunningham |
| 4,193,644 | March 18, 1980 | Miyashita, et al. |

-continued

| PATENT NO. | ISSUE DATE | INVENTOR |
|---|---|---|
| 4,215,903 | August 5, 1980 | Andrews |
| 4,327,592 | May 4, 1982 | Fincke |
| 4,351,574 | September 28, 1982 | Furukawa, et al. |
| 4,504,048 | March 12, 1985 | Shiba, et al. |
| 4,512,671 | August 23, 1985 | Giers, et al. |
| 4,569,562 | February 11, 1986 | Sato, et al. |
| 4,630,942 | December 23, 1986 | Tsumaki, et al. |
| 4,643,592 | February 17, 1987 | Lewis, et al. |
| 4,650,123 | March 17, 1987 | Ooishi |
| 4,685,813 | August 11, 1987 | Moog |
| 4,696,585 | September 29, 1987 | Swearingen |
| 4,704,879 | November 10, 1987 | Christ, et al. |
| 4,767,223 | August 30, 1988 | Goodwin |
| 4,834,559 | May 30, 1989 | Kalvoda |
| 4,944,609 | July 31, 1990 | Salter, Jr., et al. |
| 4,947,639 | August 14, 1990 | Hibner, et al. |
| 5,033,317 | July 23, 1991 | Van Haag |
| 5,034,639 | July 23, 1991 | Huss, et al. |
| 5,063,322 | November 5, 1991 | Sugita, et al. |
| 5,064,297 | November 12, 1991 | Tanaka, et al. |
| 5,066,197 | November 19, 1991 | Champagne |
| 5,099,966 | March 31, 1992 | Wöhrl |
| 5,104,237 | April 14, 1992 | Slocum |
| 5,121,341 | June 9, 1992 | McCabria, et al. |
| 5,149,206 | September 22, 1992 | Bobo |
| 5,197,807 | March 30, 1993 | Kuznar |
| 5,201,585 | April 13, 1993 | Gans, et al. |
| 5,203,762 | April 20, 1993 | Cooperstein |
| 5,219,447 | June 15, 1993 | Arvidsson |
| 5,238,308 | August 24, 1993 | Lang, et al. |
| 5,281,032 | January 25, 1994 | Slocum |
| 5,344,239 | September 6, 1994 | Stallone, et al. |
| 5,356,225 | October 18, 1994 | Hanes, et al. |
| 5,360,273 | November 1, 1994 | Buckmann |
| 5,364,190 | November 15, 1994 | Ochiai, et al. |
| 5,374,129 | December 20, 1994 | Vohr, et al. |
| 5,391,002 | February 21, 1995 | Eigenbrod |
| 5,447,375 | September 5, 1995 | Ochiai, et al. |
| 5,484,208 | January 16, 1996 | Kane, et al. |
| FOREIGN PATENT DOCUMENTS | | |
| GB 2,121,892 | January 4, 1984 | Mohsin |
| JP 0045110 | May 3, 1986 | Nippon Seiko K.K. |

The patent to Cunningham, U.S. Pat. No. 4,035,037, issued Jul. 12, 1977, teaches a hydrostatic bearing support in which a plurality of pressure plates coact with a housing which has a central bore adapted to receive a rotor and a conventional bearing assembly therebetween. This device uses a fluid film bearing, but unlike the instant invention cannot cause the fluid adjacent the rotor to directly change its force profile to provide centered support for the rotor.

Goodwin, U.S. Pat. No. 4,767,223, issued Aug. 30, 1988, teaches the use of a hydrodynamic journal bearing in which an undriven accumulator attempts to respond to changes occurring within clearance that exists between a journal and its circumscribing bearing bush.

Kano, et al., U.S. Pat. No. 3,742,653, issued Jul. 3, 1973 teaches the use of a control device for the radial displacement of shafts in which an upper and front pocket and a rear and lower pocket surround the shaft and a control valve provides pressurized fluid to the upper and front pockets and to the rear and lower pockets respectively to radially displace the axis of the shaft. Because the purpose for this device is to control the feed for a grinding wheel to provide full automation during a grinding cycle, the cycle reflects predictable force profiles.

The patent to Miyashita, et al., U.S. Pat. No. 4,193,644, issued Mar. 18, 1980 teaches the use of a servo control system to position a hydrostatically supported member such as the table of a machine tool or a rotary shaft in which a closed loop control system includes a differential amplifier for effecting a subtraction operation between the amount of displacement of a member and an amount of reference signal. A servo amplifier delivers a control signal while a servovalve supplies operating pressure upon receipt of the control signal to the member.

All of the foregoing patents specifically discussed and those which were cited to show the state of the art further fail to provide substantially instantaneous response to shaft perturbations which cause resonant frequencies and vibration and which drive the shaft from a pure center rotation. A further problem the prior art fails to resolve is that because incompressible fluid theoretically provides a desirable cushion between a rotating member and its stationary support, incompressible fluids also have an inherent lag in the ability to respond to dynamic changes, particularly sudden unexpected loads and high speed fluctuations.

SUMMARY OF THE INVENTION

This instant invention is distinguished over the known prior art in a multiplicity of ways. For one thing, the problem of the inertia associated with the hydrostatic fluid has been solved according to the instant invention. Further, the solution in quickly delivering hydrostatic fluid necessarily involves initial accurate sensing with respect to static and dynamic loading of a shaft which induce shaft precession. Once detected, the shaft precession needs to be rectified by substantially instantaneous delivery of corrective fluid. These problem are resolved by a hydrostatic bearing, a fluid flow system and a control system according to the instant invention.

In one preferred form, the control system is operatively coupled between the shaft and the fluid flow system for sensing the shaft position for any anomalous displacement and for cooperating with the fluid flow system to instantaneously deliver a differential flow of fluid to the bearing for providing a fluidic force differential on the shaft which is in a direction calculated to remove the anomaly. The reaction to anomalies is substantially instantaneous thereby providing balanced, high speed shaft rotation.

Each bearing supporting the shaft includes a plurality of circumferentially spaced and diametrically opposed pockets which are in communication with portals. The portals distribute fluid from the fluid flow system to the shaft via the diametrically opposed pockets of the bearing. In effect, the fluid flow system allocates a large quantity of constantly flowing fluid to diametrically opposed sides of the shaft to maintain hydrostatic effectiveness. In addition, the instant invention provides a dynamically proportional fluid flow to react with the constantly flowing fluid to counter any anomalous displacement due to, for example, shaft/system forces.

As a result, there is no appreciable time lag in delivering the correcting fluid, thereby promulgating stable shaft rotation. In addition, the instant invention dynamically aligns and balances the shaft motion within the fluid bearing as a function of the static and dynamic loading of the shaft thereby actively reducing vibration.

Furthermore, whereas prior fluid bearings had problems with "swirl" (skin friction between the rotating shaft and the fluid which causes the fluid to join the shaft in rotation) the instant invention provides strong impediments to fluid swirl by providing, inter alia, a dynamically proportional fluid flow to react with the constantly flowing fluid to provide a fluidic force differential reacting with the shaft.

OBJECTS OF THE INVENTION

Accordingly, it is a primary object of the instant invention to provide a new and novel fluid flow and control system for a hydrostatic bearing supporting rotating equipment according to the instant invention.

A further object of the instant invention is to provide a device as characterized above which is substantially instantaneous in its response to anomalies in shaft excursions.

Another further object of the instant invention is to provide a device as characterized above which is extremely reliable in use and enhances the safety associated with the operation of a machine being so affected.

Another further object of the instant invention is to provide a device as characterized above in which the tendency of the fluid to be influenced by the shaft rotation will have been minimized, thereby minimizing swirl.

Another further object of the instant invention is to provide a device as characterized above which may induce a perturbation by delivering a differential fluid force to opposed areas of a rotating shaft (for example of an on-line machine) and then monitor and analyze the real time machine response to obtain diagnostic, base-line characteristics or signatures of that specific machine.

Another further object of the instant invention is to provide a device as characterized above which employs the use of fluid flow and control signals for measuring internal machine forces.

Another further object of the instant invention is to provide a device as characterized above which provides machine balance even when, for example, the machine is a turbine which has thrown a blade such that the invention allows time for machine shut down without catastrophic results.

Another further object of the instant invention is to provide a device as characterized above which provides on-line machinery alignment, within the clearances, to provide a tool for optimizing machinery performance such as power efficiency and/or stability.

Another further object of the instant invention is to provide a device as characterized above which is not overly susceptible to fluid particulate.

Viewed from a first vantage point, it is an object of the instant invention to provide a fluid flow control system for a bearing, comprising in combination: a source of fluid; a flow regulator operatively extending between the source of fluid and the bearing, and; diverter means interposed between the flow regulator and the bearing for controlling fluid flow in the bearing.

Viewed from a second vantage point, it is an object of the instant invention to provide a method for abating shaft precession with a fluid flow control system, the steps including: monitoring a shaft for precession, delivering a regulated flow of fluid in diametrically opposed streams to the shaft through portals of a bearing, determining whether the opposing streams should have pressure differentials, and modulating the diametrically opposed streams of fluid for delivering the differential pressure to the portals for abating shaft precession.

These and other objects will be made manifest when considering the following detailed specification when taken in conjunction with the appended drawing figures.

BRIEF DESCRIPTION OF THE DRAWINGS

FIG. 1 is a schematic view of a load bearing shaft with a hydrostatic fluid bearing apparatus according to the instant invention disposed on sides of the shaft between which the load is imposed.

FIG. 2 is a partial sectional view taken along lines 2—2 of FIG. 1 showing the effect of a load on the shaft and the bearing according to the instant invention.

FIG. 3 is a view similar to FIG. 2 with the load corrected according to the instant invention.

FIGS. 12 and 13 detail one form of a horizontal and a vertical controller circuit.

DESCRIPTION OF PREFERRED EMBODIMENTS

Figure 4:
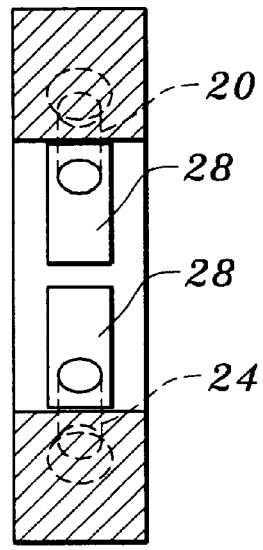
FIGS. 4 and 5 show one form of the bearing which delivers fluid to cause the correction shown in FIG. 3.

Considering the drawings, wherein like reference numerals denote like parts throughout the various drawing figures, reference numeral 10 is directed to the fluid flow and control system for a hydrostatic bearing supporting rotating equipment according to the instant invention.

In essence and referring to the drawing figures, the instant invention includes a bearing apparatus 12 having a plurality of fluid portals 18, 20, 22 and 24, a fluid source 32 and flow restrictors 50 strategically oriented upstream, between the fluid source 32 and the bearing apparatus 12. In addition, a plurality of valves or diverters 80 are either interposed between the restrictors 50 and the bearing apparatus 12 or downstream, between the bearing apparatus 12 and the fluid source 32.

Figure 11:
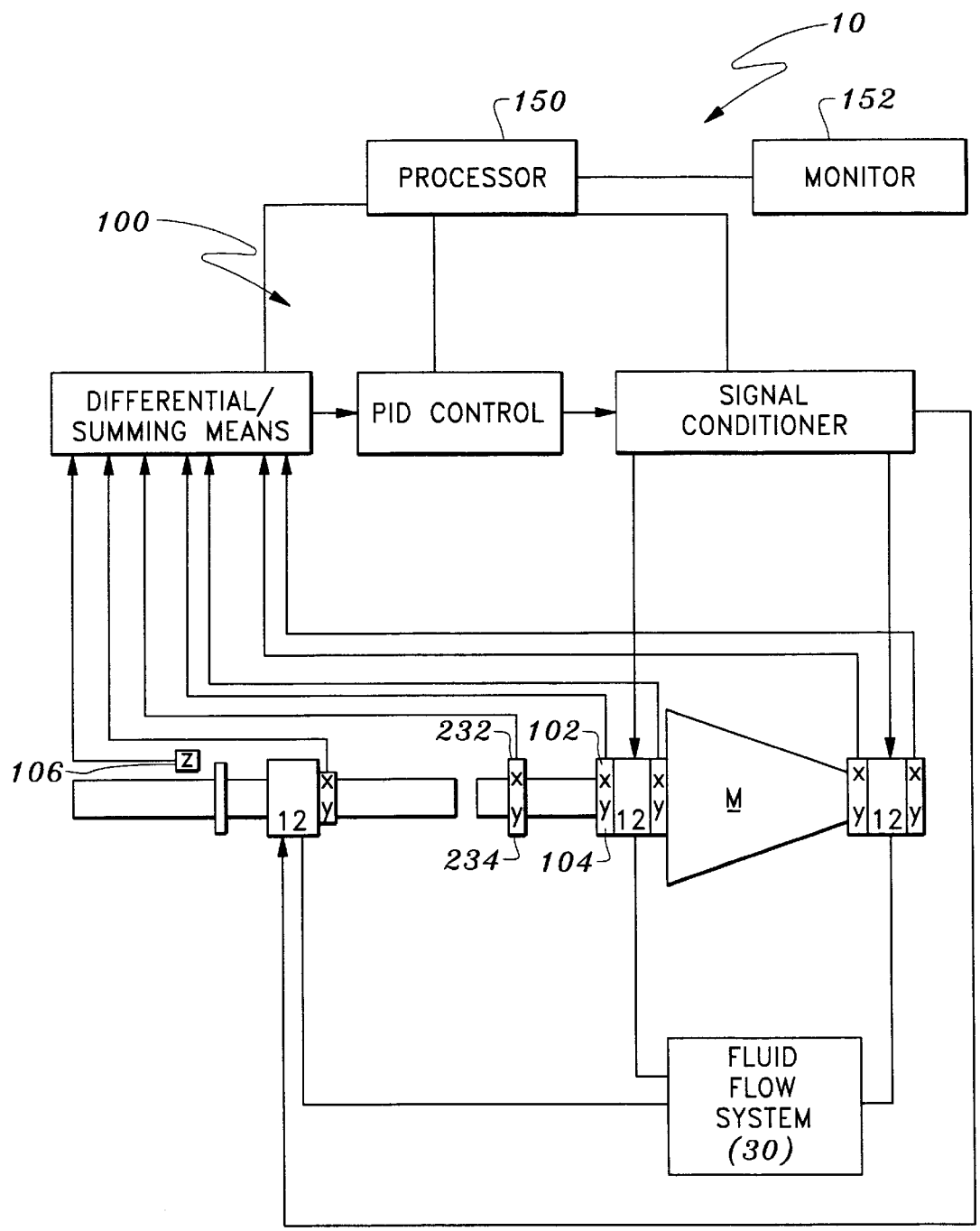
FIG. 11 is an overview of an electro-hydraulic control system for the fluid flow system and bearing.

Referring to the drawing figures, the instant invention provides a fluid flow and control system for a hydrostatic bearing supporting rotating equipment (FIG. 11) including a fluid flow system 30 (FIGS. 6A and 6B) and a control system 100 (FIG. 11). The fluid flow system 30 preferably includes a plurality of flapper valves 80 (FIG. 8) which direct fluid through portals 18, 20, 22 and 24 (FIG. 5) of a fluid bearing 14 disposed in a bearing block 16 such that fluid forces "F" may be applied to a rotor shaft S of a machine M. The control system 100 provides the control signals which manipulate the valves 80 in order to control the flow of the fluid through the portals 18, 20, 22 and 24 which lead to a variable clearance between the rotor shaft S and the stationary fluid bearing 14. The fluid suspends the rotor shaft S away from the bearing 14 of the machine M while actively controlling the static and dynamic motion of the rotor shaft S.

Figure 9:
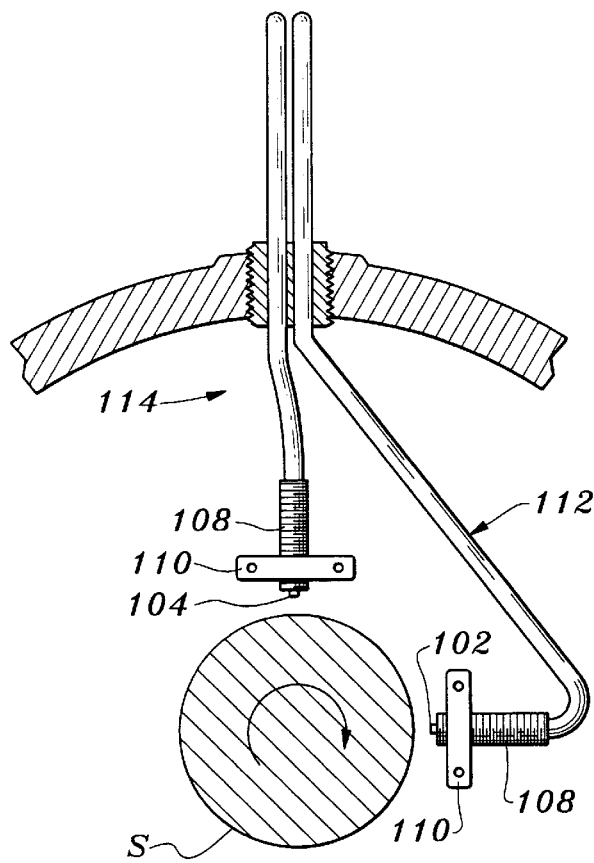
FIG. 9 shows one arrangement for sensors which provide control signals to a control circuit to control the FIG. 8 motor and therefore the shaft's position.
Figure 10:
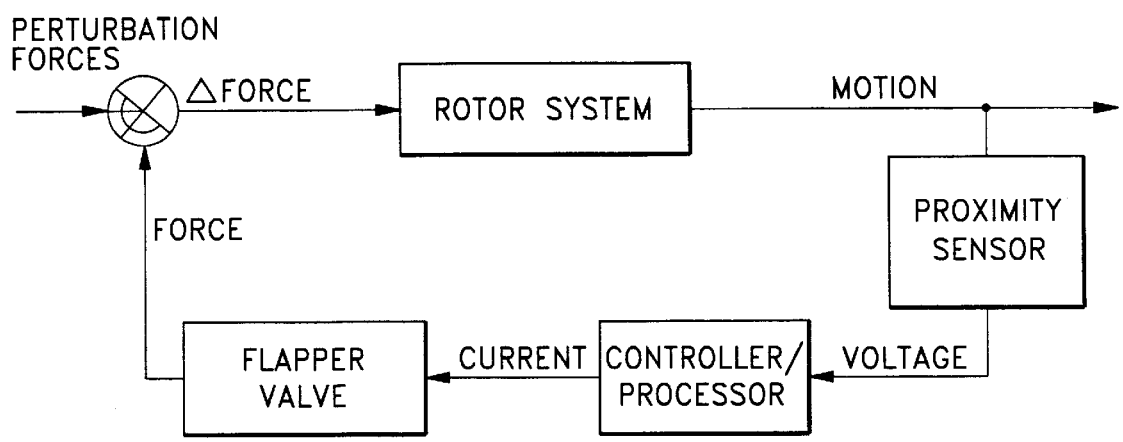
FIG. 10 shows a simplified single channel control loop block diagram of the hydrostatic fluid bearing apparatus according to the instant invention.

One embodiment of the control system 100 employs at least one XY pair of proximity transducers 102, 104 (FIG. 9) to measure the static and dynamic motion of the rotor shaft S relative to the bearing. The XY pair of proximity transducers 102, 104 provide a two dimensional coordinate of the position of the rotor shaft within the bearing when fixed orthogonal to one another. A third proximity transducer 106 (FIG. 11) may be fixed orthogonal with respect to both the X and Y proximity transducers 102, 104 to obtain a three dimensional coordinate of the position of the rotor shaft S within the bearing 14.

Each proximity transducer converts the motion of the rotor shaft to a voltage signal. The proximity voltage signals are outputted to a control circuit 120 (FIGS. 12 and 13). The control circuit 120 accepts the voltage signals as input signals and includes means to compare these input signals with a set of reference voltages correlative to a desired shaft location relative to the bearing and to obtain a difference signal between the input signals and the reference voltages. The outputs of the comparing means are preferably passed to a plurality of PID (proportional integral derivative) circuits of the control circuit. The PID circuits accept the outputs of the comparing means as input signals and provide PID output signals which are a derivative of, an integral of and proportional to the input signals from the comparing means. The PID output signals of each PID circuit are then each weighted with a gain and summed together by a summing circuit. Each summing circuit then outputs a signal to a voltage to current converter circuit which outputs a current signal which drives a respective valve 80 to differentially direct fluid and therefore, fluid forces onto the rotor shaft to react against rotor system forces to actively control the dynamic motion, position and stability of the rotor.

More specifically, and referring to FIG. 1, a schematic depiction is shown of a machine M being monitored for displacement in three directions with respect to shaft movement: radially and axially relative to a bearing. A typical monitor for radial displacement can be seen in FIG. 9. There, a shaft S will move based on fluctuations induced therein from the machine M. The machine M can be any of several types of instrumentalities which require a bearing supported shaft, such as a turbine, pump, prime mover, generator or the like. First and second transducers 102, 104 respectively, are influenced by the proximity of the shaft S to the transducer. This provides a representation in an X and Y coordinate system since the transducers 102, 104 are ninety degrees apart. The transducers 102, 104 are preferably initially oriented to calibrate their distance a known amount from the shaft S. This calibration can be performed by advancing each transducer's respective threaded outer casing 108 relative to a support 110 having an internal thread therewithin complemental to the threads 108 on the casing. Conductors 112 and 114 transfer the information with respect to the "X" probe 102 and "Y" probe 104.

Referring to FIG. 11, a pair of XY observation probes 102, 104 are disposed on both sides of the bearing apparatus 12 to observe the shaft adjacent both sides of bearing 14. In addition, a pair of modal probes 232, 234 may be disposed adjacent the shaft remote from the bearing apparatus 12.

Figure 23:
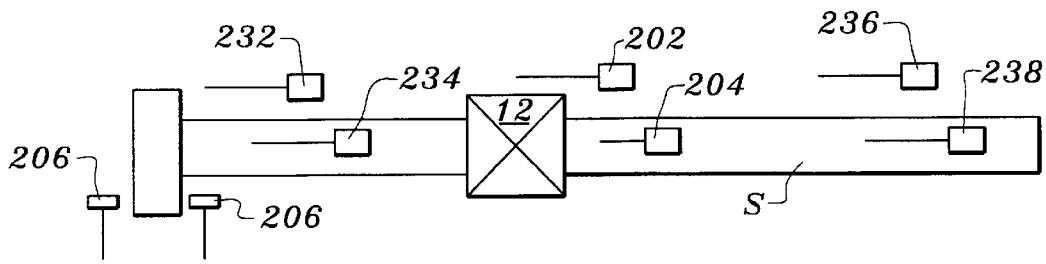
FIG. 23 is a schematic view of the placement of X,Y, and Z sensors and modal identification sensors with respect to a shaft.

Referring to FIG. 23, observation probes 202, 204 are shown orthogonally disposed on one side of the bearing apparatus 12 and modal probes 232, 234 are shown orthogonally disposed on the other side of the bearing apparatus 12 to observe the shaft adjacent the bearing 14. In addition, a second pair of modal probes 236, 238 are orthogonally disposed away from the bearing 14 and adjacent the shaft S to provide modal identification signals which can be inputted to the control system 100 to change the bearing characteristics through resonances. Furthermore, differential expansion or motion transducers 206 can be operatively coupled adjacent a collar of the shaft S to measure the Z translation of the shaft S.

As shown in FIG. 2, a bearing block 16 including a fluid bearing 14 circumscribes the shaft S. In this depiction, the shaft S is not symmetrically disposed within the clearance of the bearing 14 and there is a gap G at the top of the shaft greater than at the bottom. At the heart of the invention, fluid may be provided in diametrically opposed pairs through the restrictors 50 and/or the valves 80 shown in FIGS. 6A and 6B so that a force $F_1$ can be diametrically opposed by a force $F_3$ and a force $F_2$ can be diametrically opposed by a force $F_4$. These opposing forces can vary in magnitude based on the readings of the transducers 102, 104 of FIGS. 1 and 9. Thus, FIG. 3 reflects the shaft S being symmetrically disposed within the bearing block 14 after appropriate fluidic pressure correction. No gap G anomalies circumscribe the shaft S within the bearing block 14. The shaft is now being stably supported and is uniformly substantially equidistant from the bearing block 14.

On the other hand, the fluid bearing apparatus may intentionally provide fluidic forces on the shaft which result in an unsymmetrically disposed shaft within the bearing clearance. For example, if the shaft becomes unbalanced the instant invention can provide instantaneous response to the perturbation which may result in the off centering of the shaft to eliminate the unbalance and/or vibration while maintaining a minimum default tolerance between the shaft S and bearing 14.

Figure 5:
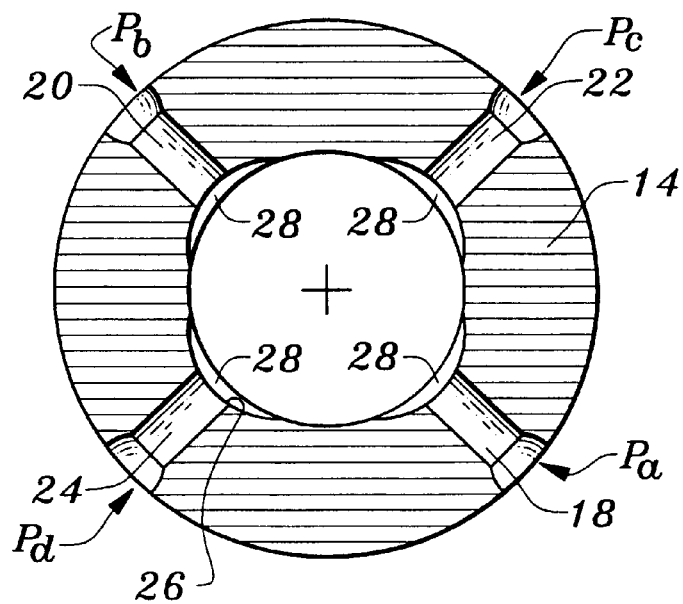
Figure 6A:
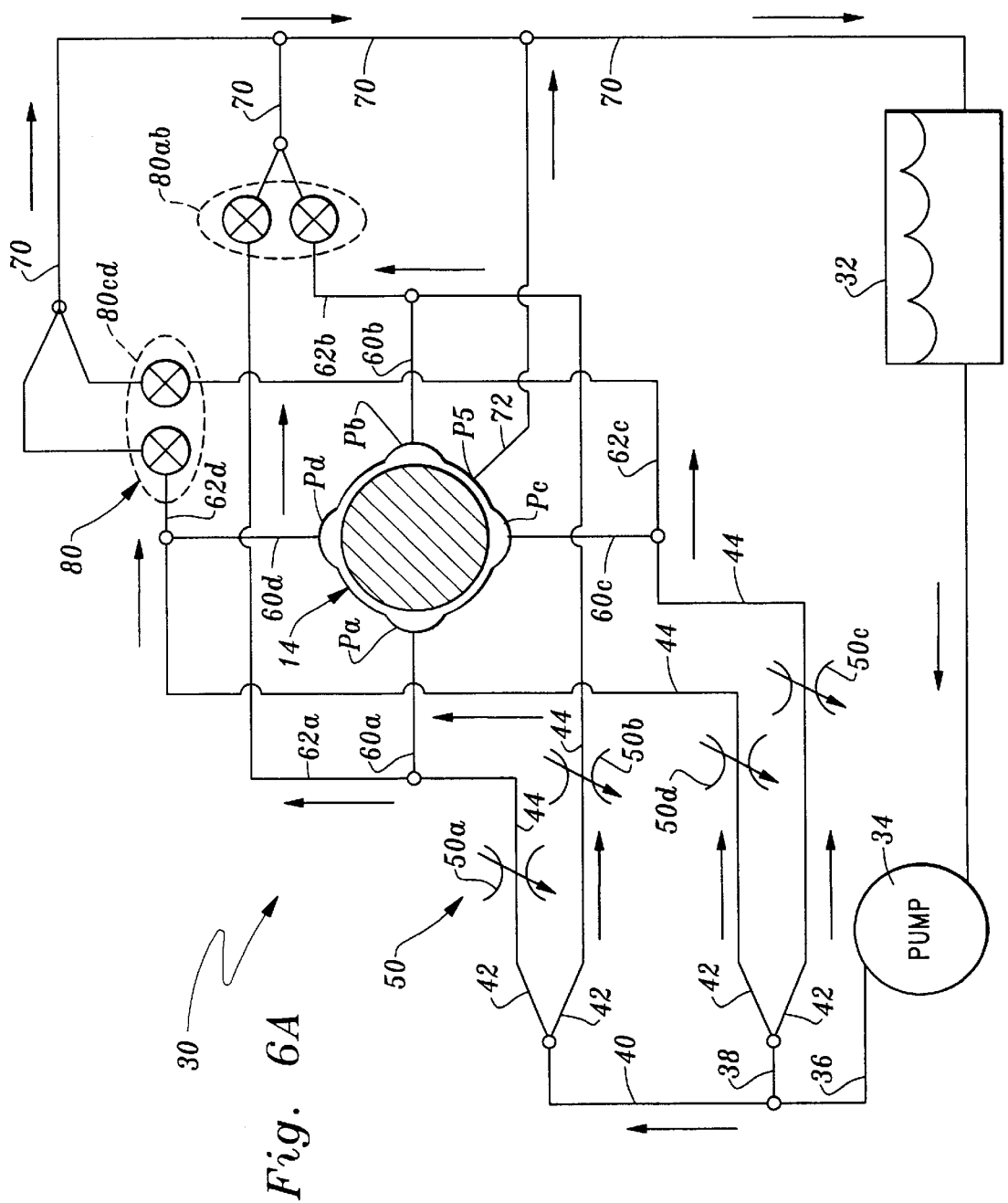
FIGS. 6A and 6B are diagrams of the fluid flow system showing how fluid is delivered to the fluid bearing according to the instant invention.
Figure 6B:
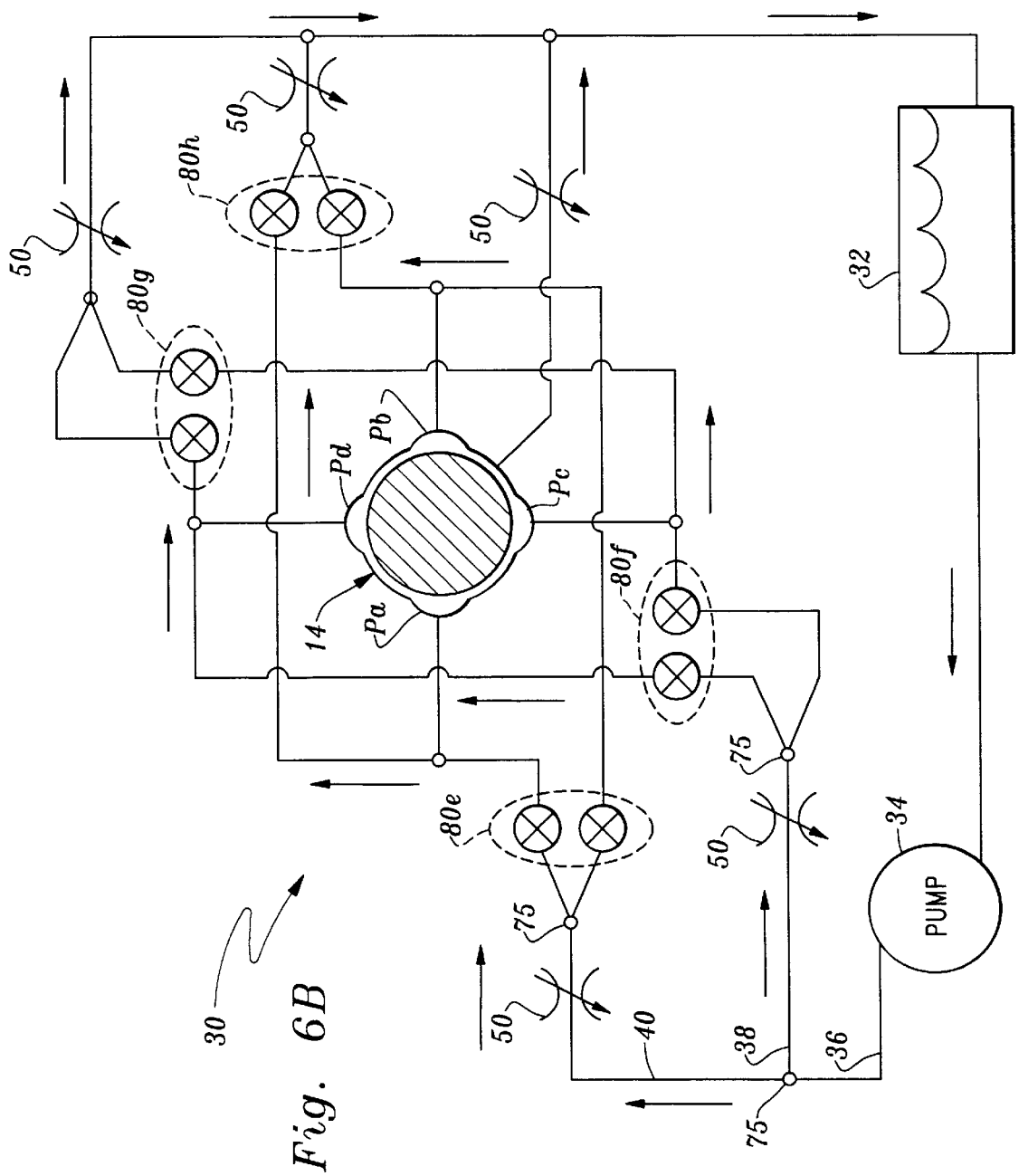

Referring to FIGS. 4 and 5, one form of bearing 14 is disclosed. As shown in FIG. 6A and 6B, fluid from the restrictors 50 and/or the valves 80 (to be described) can enter within the bearing via the radial portals and pockets. All portals preferably communicate with respective passages within the interior of the bearing block 16. The pockets 28, as shown in FIG. 4. are somewhat rectangularly shaped. However, the actual geometrical form may be any shape. FIG. 5 shows that each pocket 28 has an arcuate cutaway 26 with a substantially constant radius of curvature.

Referring to FIG. 5, each radial portal/pocket combination 18,28; 20,28; 22,28; 24,28 will be respectively delineated as Pa, Pb, Pc and Pd in FIGS. 6A and 6B for the following discussion of the fluid flow system 30.

Referring to FIG. 6A, the fluid flow system 30 includes a fluid source or reservoir 32 that provides fluid to a high pressure pump 34. The high pressure pump 34 delivers fluid to flow restrictors 50 via a pump supply line 36. The fluid is branched into two passageways 38, 40 which are each in turn branched into passageways 42. Each passageway 42 communicates with one flow restrictor 50a, 50b, 50c, 50d for communicating with each radial portal/pocket combination Pa, Pb, Pc and Pd respectively. The valves 80 are strategically oriented upstream, between the fluid source 32 and each radial portal/pocket combination Pa, Pb, Pc and Pd of bearing apparatus 12.

Alternatively, and referring to FIG. 6B, the high pressure pump 34 delivers fluid to valves or diverters 80 via splitters 75. In this case each valve or diverter 80 is provided upstream from the pump 34 and feeds fluid to the bearing apparatus 12 and to a downstream valve or diverter 80 under the control of the control system 100. The downstream valve or diverter 80 is interposed between the bearing apparatus 12 and the fluid source 32. Specifically, the flapper valves upstream (80e, 80f) can be controlled by the control system 100 to provide a constant or differential flow which can be modulated by the flapper valves 80g, 80h respectively to provide a dynamically proportional fluid flow to react with the fluid flow from the flapper valves 80e, 80f to counter any anomalous displacement.

Figure 7:
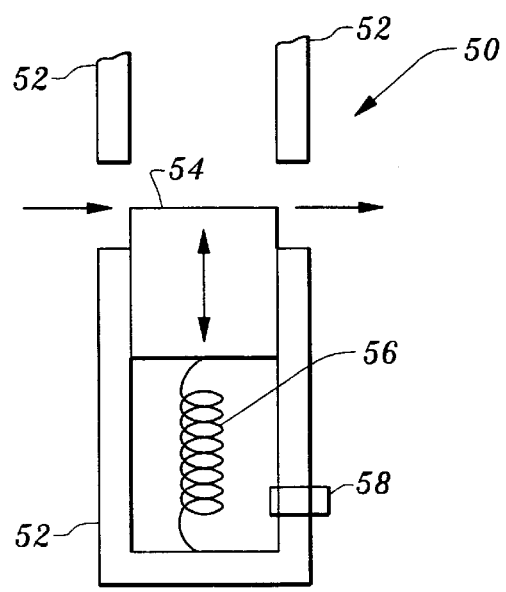
FIG. 7 shows details of a flow regulator valve which delivers fluid to the fluid bearing according to the instant invention.
Figure 8:
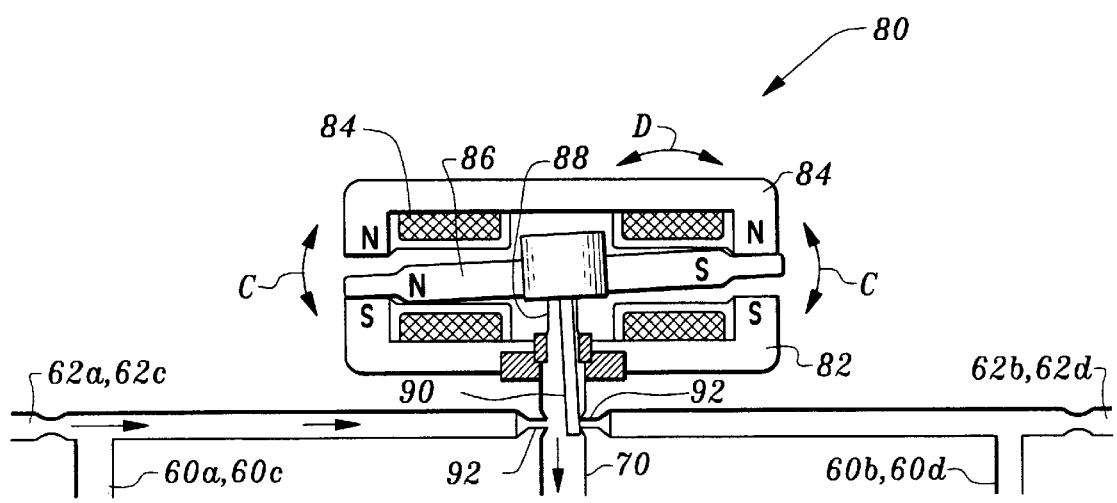
FIG. 8 shows a view of a nozzle flapper valve receiving a control signal for modulating fluid flow to the fluid bearing according to the instant invention.

More specifically, and referring to FIGS. 6A, 7 and 8, the fluid flow system 30 includes a fluid source or reservoir 32 that provides fluid to a high pressure pump 34 which delivers fluid flow to pump supply line 36. The fluid in line 36 is diverted into four flow restrictors 50a, 50b, 50c, 50d for communicating with each radial portal/pocket combination Pa, Pb, Pc and Pd respectively. In addition, the four flow restrictors 50a, 50b, 50c, 50d are paired to communicate with one flapper valve or diverter 80. Specifically, the flow restrictor pair 50a, 50b communicate with flapper valve 80ab and the flow restrictor pair 50c, 50d communicate with flapper valve 80cd via respective passageways 62a, 62b, 62c and 62d.

In operation, the control system 100 is operatively coupled between the shaft and the fluid flow system 30 for sensing the shaft position for any anomalous displacement and for cooperating with the fluid flow system 30 to instantaneously deliver a differential flow of fluid to the bearing for providing a fluidic force differential on the shaft which is in a direction calculated to remove the anomaly.

Specifically, the four flow restrictors 50a, 50b, 50c, 50d allocate a large quantity of constantly flowing fluid to diametrically opposed sides of the shaft via portal/pocket combination Pa, Pb and Pc,Pd to maintain hydrostatic effectiveness. In addition, the instant invention provides a dynamically proportional fluid flow to react with the constantly flowing fluid to counter any anomalous displacement by allowing the flow restrictor pair 50a, 50b to communicate with flapper valve 80ab and allowing the flow restrictor pair 50c, 50d to communicate with flapper valve 80cd via respective passageways 62a, 62b, 62c and 62d.

Referring to FIG. 7, each flow restrictor is preferably comprised of an outside valve body 52 circumscribing a piston 54 and a spring 56. The piston rides along the interior walls of the body 52 at a location proximate an inlet port and outlet port which communicate with passageways 42, 44 respectively. The spring is operatively coupled to the piston for biasing the piston at a location which allows a constant output of fluid via the outlet port regardless of what the supply pressure is (pump pressure) and what the load pressure is (fluid force within the bearing). In other words, depending on the pressure of the supply and/or load, the spring is forced up or down to proportionally open or close the inlet and outlet ports to provide a predetermined amount of fluid flow to each portal/pocket combination. Thus, the flow restrictor is a type of device which will now be evident to those having ordinary skill in the art, informed by the present disclosure.

Figure 16:
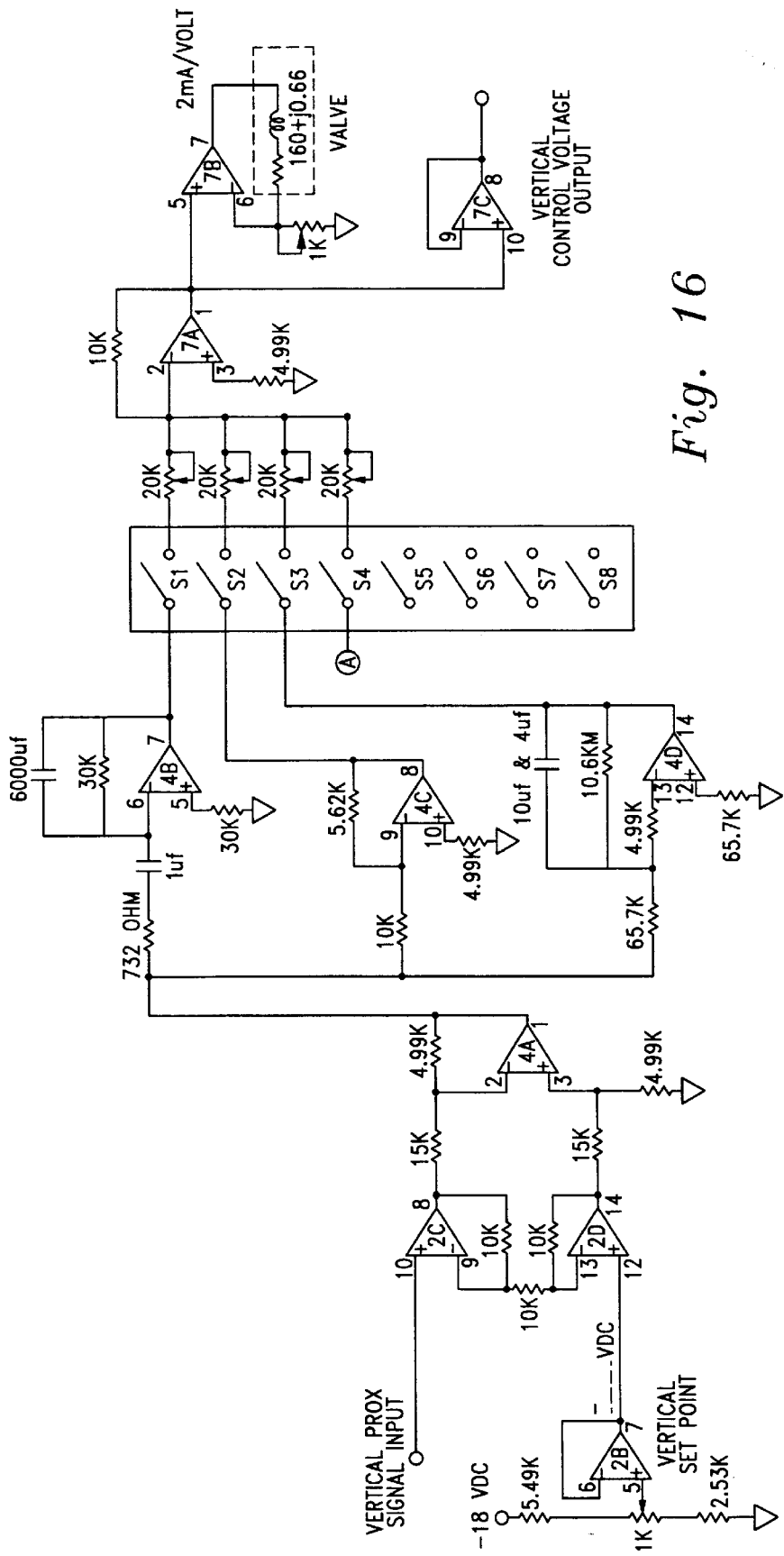

Referring to FIG. 16, the signals that are sent from the transducers 102, 104 are processed by the control system 100 and then delivered as input to torque motor 82 (FIG. 8) of each valve 80 so that the diametrically opposing forces $F_1$ and $F_3$ and $F_2$ and $F_4$ can be matched to offset shaft precession and vibration.

Referring to FIG. 8, each valve 80 (shown as 80ab and 80cd in figure in FIG. 6A) a torque motor 82 which is operatively coupled to the control system 100 as shown in FIGS. 12 and 13. The torque motor 82 converts the control signals (current signals) to a mechanical force or motion. A flexure tube 88 supports an armature 86 of the motor 82 and also acts as a fluid seal between the hydraulic and electrical sections of each valve 80. Attached at a center of the armature 86 is a flapper 90. The flapper 90 extends down through the flexure tube 88. The flexure tube 88 acts as a spring for limiting the motion of the flapper 90 between two nozzle seats 92.

The inputs are operatively coupled to a pair of coils 84 of the motor 82 and allow input signals from the control system 100 to be provided to the coils 84 for polarizing the armature ends and creating a rotational torque on the armature 86 which, in response, moves about the double ended arrow "C". The flapper which depends from the torque motor 92 is similarly influenced along arrow "D" by the rocking motion along the double ended arrow "C". This manifests itself as providing a fluid flow bias to a pair of nozzle seats 92 located on either side of and addressing the flapper 90. The relationship of the flapper 90 with respect to the nozzle seats 92 influences the degree to which inlet hydraulic fluid flows to each radial portal/pocket combination Pa, Pb, Pc and Pd. Thus, each diverter or flapper valve 80 modulates the constantly flowing fluid from the four flow restrictors 50a, 50b, 50c, 50d to diametrically opposed sides for delivering the differential pressure to the portal/pocket combinations Pa, Pb and Pc,Pd for abating shaft precession.

Referring to FIG. 8, assume the input signals cause the flapper 90 to move toward the right nozzle seat 92. This results in a greater fluid flow into passageway 62a or 62b which decreases fluid flow to portal/pocket combination Pa or Pc and increases pressure to portal/pocket combination Pb or Pd. Thus, the flapper valves 80 are used for modulating the diametrically opposed streams of fluid for delivering the differential pressure to the portals for abating shaft precession.

Optimum flow control is achieved by feedback which provides a dynamically proportional fluid flow in addition to the bias flow to react to the rotor motion. Thus, eliminating any appreciable time lag in delivering correcting fluid to the shaft.

Figure 14:
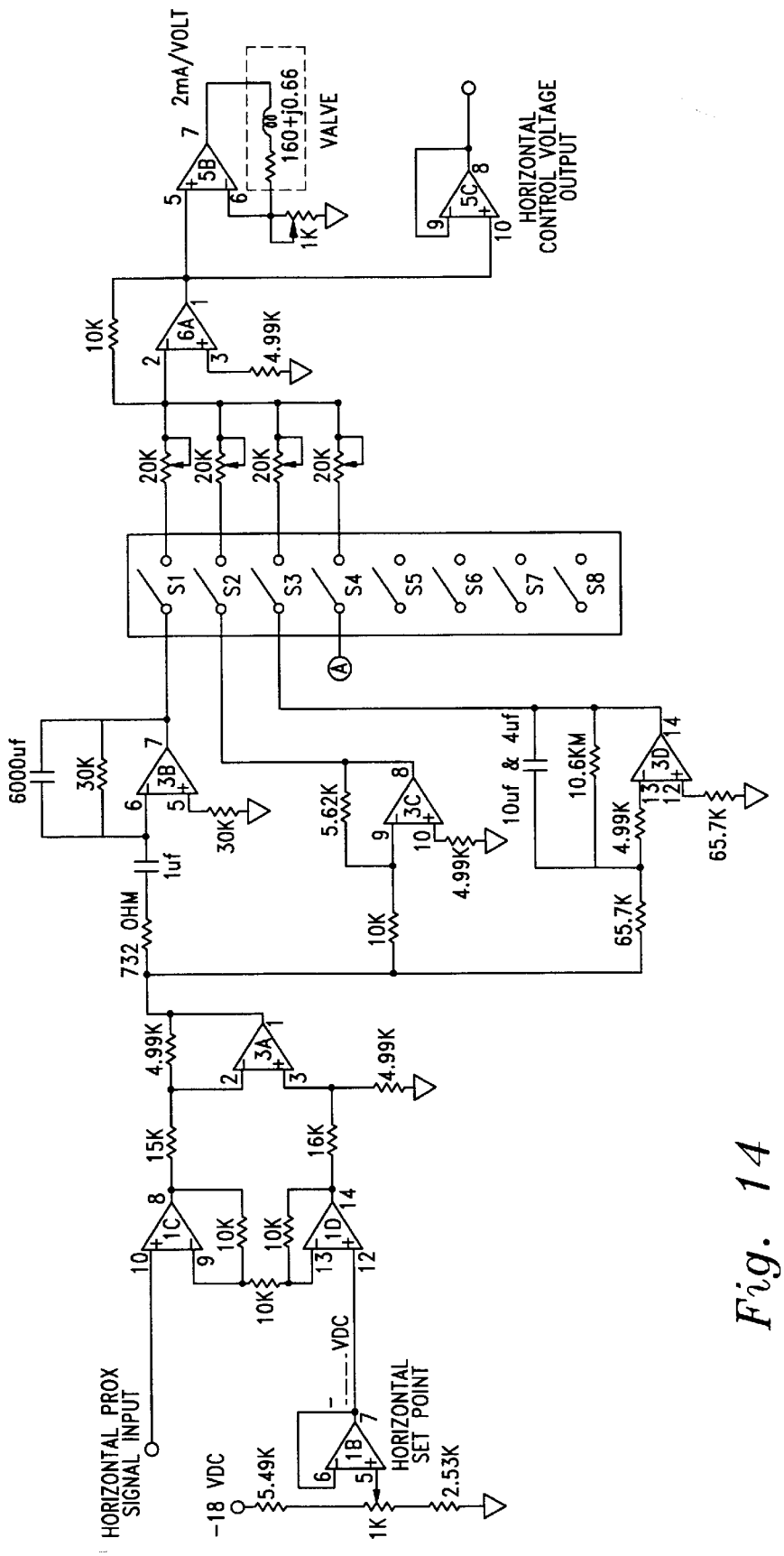
FIGS. 14, 15 and 16 further particularize FIGS. 12 and 13.
Figure 15:
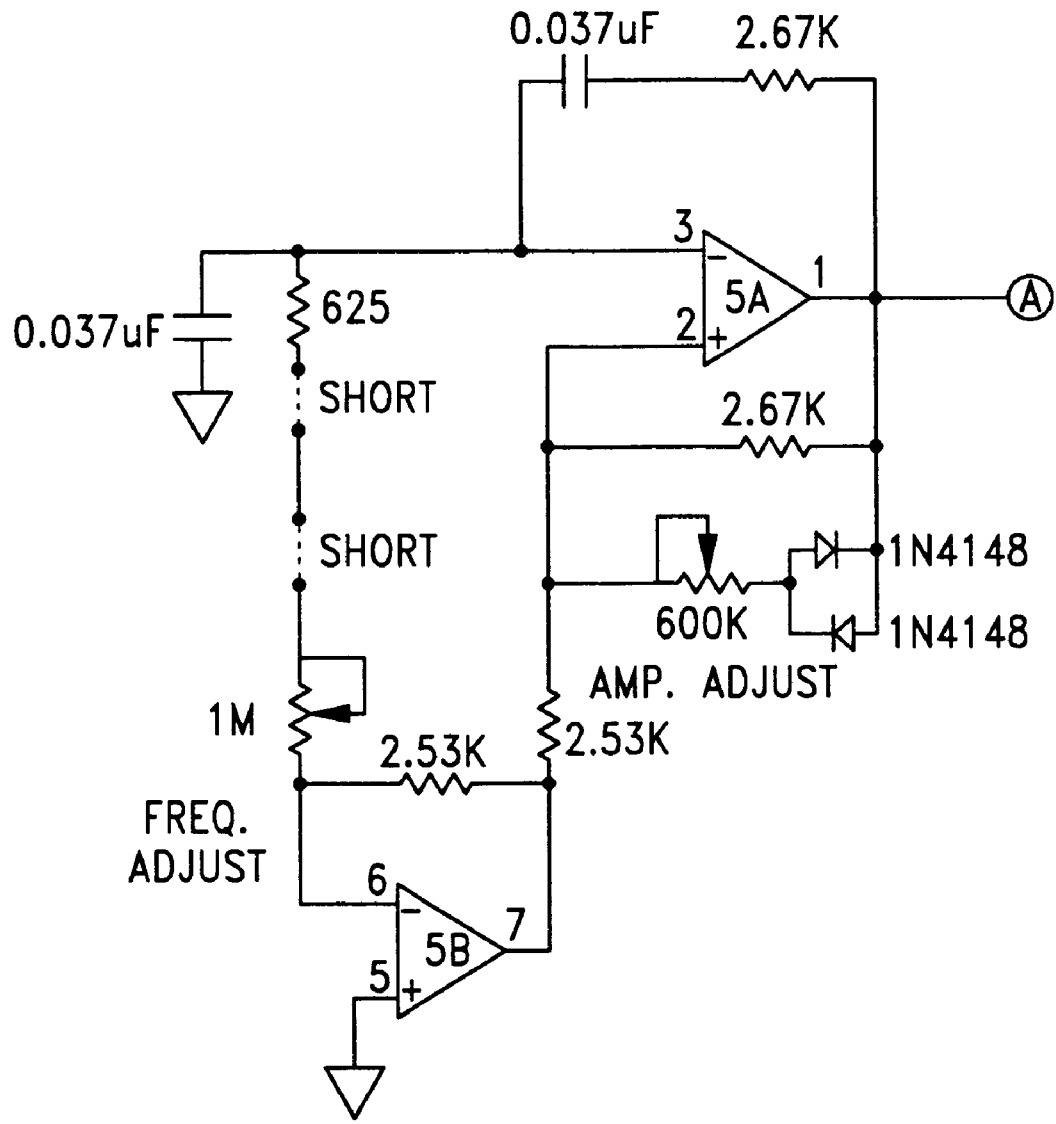

A schematic of the control circuit 120 is shown in FIGS. 14 through 16 and an associated block diagram is shown in FIGS. 12 and 13. The operational amplifiers (op-amps) shown in figure FIGS. 14 through 16 may be of a standard quadruple low-power type. An MC3403P op-amp as manufactured by Motorola is exemplary of a quadruple low-power op-amp. Preferable, dual power supplies are used to supply the op-amps with a 36 volt dc differential.

Referring to both FIGS. 12 through 16, the voltage outputs of the XY proximity transducers are directly coupled to non-inverting inputs (Pins 10) of op-amps 1c and 2c respectively. These proximity signals include all of the information in each axis as to the position of the rotor shaft at any time. The signals include a negative DC gap voltage which represents the static position of the rotor shaft and a dynamic voltage which represents the dynamic motion of the rotor shaft. As the rotor shaft moves away from any proximity transducer the signal voltage from that transducer becomes more negative and as the rotor shaft moves toward any proximity transducer the signal voltage from that transducer becomes more positive.

In order to determine if the rotor is located at a desired position at any given time, the actual signal (proximity voltage signal) must be compared to a reference signal (a static set point) which represents the desired position of the rotor shaft. The horizontal (X) and vertical (Y) reference signals are respectively provided by op-amps 1b and 2b. These op-amps are provided with an adjustable DC voltage input and are configured as non-inverting voltage followers with unity feedback. Thus, the output of the op-amps 1b and 2b should be in phase with the proximity voltage signals input to the op-amps. Note that a manually set (or automatically set) negative DC voltage is used as an alternative to a time varying signal to represent the desired position of the rotor shaft within the bearing clearance. With both electrical circuit paths (from probes, to circuit, to acting valve 80) fixed orthogonal to one another, the two create a two dimensional coordinate of the position within the bearing.

In order to compare the static set points to the actual static and dynamic proximity voltage signals, a plurality of precision differential amplifiers (instrumentation amplifiers) are used. In a horizontal signal path, op-amps 1c, 1d and 3a and associated resistors are configured as a horizontal instrumentation amplifier while in a vertical path, op-amps 2c, 2d and 4a and associated resistors are configured as a vertical instrumentation amplifier. The gain of both the horizontal and vertical instrumentation amplifiers is one, therefore, the output of each instrumentation amplifier is the difference between each respective set point voltage and each respective proximity voltage signal. Therefore, since both signals are negative, if the proximity voltage signal is more positive than the set point, the differential output is positive and vice versa. The differential voltage signals outputted from the horizontal and vertical instrumentation amplifiers are each connected to a PID (proportional integral derivative) circuit of the control system.

A horizontal PID circuit includes op-amps 3b, 3c and 3d and a vertical PID circuit includes op-amps 4b, 4c and 4d. A horizontal proportional circuit is formed around op-amp 3c and a vertical proportional circuit is formed around op-amp 4c. Op-amps 3c and 4c are configured as inverting amplifiers having a gain set by the ratio of a feedback resistor and an input resistor to an inverting terminal of each respective op-amp 3c, 4c. The output of op-amp 3c is connected to a switch S2 of a first dip switch and the output of op-amp 4c is connected to a switch S2 of a second dip switch. The dip switches will be described infra.

A horizontal derivative circuit includes op-amp 3b and a vertical derivative circuit includes op-amp 4b. The horizontal and vertical derivative circuits are each configured with an input capacitor and a feedback resistor. Thus, the horizontal derivative circuit and vertical derivative circuit each outputs a voltage proportional to the instantaneous derivative of each respective differential signal from the instrumentation amplifiers. As a result, each derivative circuit outputs a control signal which is based on the rate of change of the input signals from the instrumentation amplifiers. Therefore, horizontal and vertical derivative control signals are produced which are correlative to the rate of change of the input signals form the instrumentation amplifiers and which allow the control circuit to respond to a range of rapid changes. The derivative circuits act to add a phase lead of ninety degrees to each of the horizontal and vertical derivative control signals. Thus, one analogy is to view this as adding anticipation to the control circuit. The gain of the derivative circuits is simply the feedback resistance times the input capacitance of each respective circuit. Note that the lowest frequency for ideal differentiation is due to the feedback resistance and input capacitance and the highest frequency for ideal differentiation is due to the input resistance and input capacitance. The outputs of the horizontal and vertical derivative circuits are respectively coupled to switch S1 of the first dip switch and to switch S1 of the second dip switch.

The PID circuit further includes both a horizontal and a vertical integrator circuit. The horizontal integrator circuit is formed around op-amp 3d which is configured as a standard inverting integrating amplifier. The horizontal integrator circuit is formed around op-amp 4d and is also configured as an inverting integrating amplifier. Both integrator circuits receive the differential voltage signal from the respective instrumentation amplifier and produce an integrated differential voltage output which is proportional to the integral of the received signal. In other words, the longer the actual motion of the rotor shaft is different than the set point, the more the control circuit tries to control shaft position within the bearing. This results in a reduction in steady state and long term position error. The gain of each integrator circuit is the inverse of its input resistance times its feedback capacitance with a phase inversion. The integrated outputs of the horizontal and vertical integrator circuits are respectively coupled to switch S3 of the first dip switch and to switch S3 of the second dip switch.

The control circuit further employs op-amps 5a and 5b and associated components to configure a dither generator. Preferably, a Wein-bridge oscillator configuration is used as the dither generator. The dither generator is used to assist in the reduction of any hysteresis of the valves 80 and is designed to have a variable output frequency and a variable output amplitude. Preferably, one dither generator is provided such that it may be coupled to S4 of the first dip switch and the second dip switch. Therefore, each valve 80 is provided with hysteresis compensation means.

The dip switch provides the flexibility of dialing in various combinations of control schemes and allows the overall gain of each control scheme to be determined independently of one another.

The outputs from the horizontal proportional, integral and derivative circuits are combined using a first inverting summing amplifier employing op-amp 6a. The outputs from the vertical proportional, integral and derivative circuits are combined using a second inverting summing amplifier employing op-amp 7a. Note that both the first and second inverting summing amplifiers allow for a separate adjustable gain for each of the proportional, integral and derivative signals from each PID circuit.

Preferably, the adjustable gains are accomplished by using trimpots as the input resistors of the summing amplifiers. The gain of the summing amplifiers is equal to the magnitude of the feedback resistance divided by the magnitude of the input resistance (the resistance of the trimpot).

The output of each summing amplifier is coupled to a voltage to current converter circuit. A horizontal voltage to current converter circuit is build around op-amp 6b and a vertical voltage to current converter is built around op-amp 7b. A first series connected torque converter of the valve 80ab is operatively coupled in a feedback loop of the horizontal converter circuit and a second series connected torque converter of the second valve 80cd is operatively coupled in a feedback loop of the vertical converter circuit. Each converter circuit includes a trimpot operatively coupled between an input of each op-amp and circuit ground. Each trimpot may be adjusted to provide a desired scale of conversion between the horizontal and vertical control voltages and a horizontal and a vertical control current being delivered to the respective torque converters of the valves.

Furthermore, op-amps 5c and 7c are respectively configured as a horizontal and a vertical non-inverting unity voltage follower. The horizontal voltage follower is operatively coupled to the first summing amplifier and the vertical voltage follower is operatively coupled to the second summing amplifier. The horizontal and vertical voltage followers act to buffer the respective horizontal and vertical control voltages from the summing amplifiers to a computerized acquisition system to be used as process variable units.

As seen in FIG. 11, the system 10 is provided for X, Y and Z shaft excursions of a prime mover M. Fluid flow goes to the bearings 14. The fluid's effect is shown by the transducers 102, 104 which generate a signal processed as set forth above. Archived data stored in a processor 150 and monitored by monitor 152 can condition signals into the fluid flow system or implement shut down and/or maintenance and provide a display thereof.

The bearing apparatus 12 in cooperation with the control system 100 and the fluid flow system 30 provides means for aligning the rotor shaft as the machine is running or on-line. The bearing system provides continuous alignment of the rotor shaft while machine temperatures are warming up and thermal growth is taking place. In effect, the bearing apparatus 12 and fluid flow system 30 allocates, under control, a large quantity of constantly flowing fluid to the shaft to maintain hydrostatic effectiveness. In addition, the instant invention provides a dynamically proportional fluid flow to modulate the static bias flow to actively align the shaft as the machine is running or on-line and the control system 100 provides, inter alia, shaft position feedback. Therefore, the system 10 also allows one to experiment with different clearance positions of the rotor shaft with respect to the bearing until a clearance is found which results in optimum machine performance. Processor 150 and monitor 152 can be used to process, store and display the experimental data.

In addition, the system 10 provides the ability to instantaneously control a shaft imbalance in order to afford an operator time to either shut the machine down or to continue operation until an appropriate course of action is decided. For example, a turbine blade section or a total blade breaks loose. The imbalance of the machine is so drastic and quick occurring that a machine operator would have no opportunity to shut the machine down much less make a judgment fast enough to react to this type of catastrophe. The bearing system 10 solves this problem by instantaneously responding to a drastic imbalance to preclude a catastrophic machine failure. For example, if the shaft becomes unbalanced the instant invention can provide an instantaneous differential fluid force to opposed areas of a rotating shaft resulting in the off centering of the shaft to eliminate the extreme unbalance and vibration while maintaining a minimum default tolerance between the shaft S and bearing 14.

A further important attribute of the bearing system is that it allows one to directly measure machine forces acting on the shaft without having to go back and look at the dynamic response of the rotor shaft which is a response to the forces and stresses of the machine. The bearing system allows one to look at the cause of the imbalance correlative to machine forces.

Machine forces include, inter alia, imbalanced forces, gravitational forces, preload forces and fluid forces. All of these forces act on the rotor shaft and the rotor shaft reacts according to these forces. The bearing system reacts to the machine forces to stabilize the machine. Therefore, the forces of fluid impressed on the rotor are correlative to the machine forces impressed on the fluid. Thus, by processing the control signal which is responsible for the fluidic forces on the rotor, a real time signal is obtained which is correlative to the machine forces. Accordingly, the machine forces are discerned directly and not inferred from shaft monitoring apparatus.

The bearing system may also be employed as a perturbation device for use in discerning machine parameters. For example, in FIG. 11 control signals from the controller may be sent to the valves 80 to create an externally applied perturbation force on the rotor shaft. The externally applied force causes a response from the rotor which is monitored by the FIG. 11 transducers to ascertain the parameters of the machine while the machine remains on-line.

Figure 17:
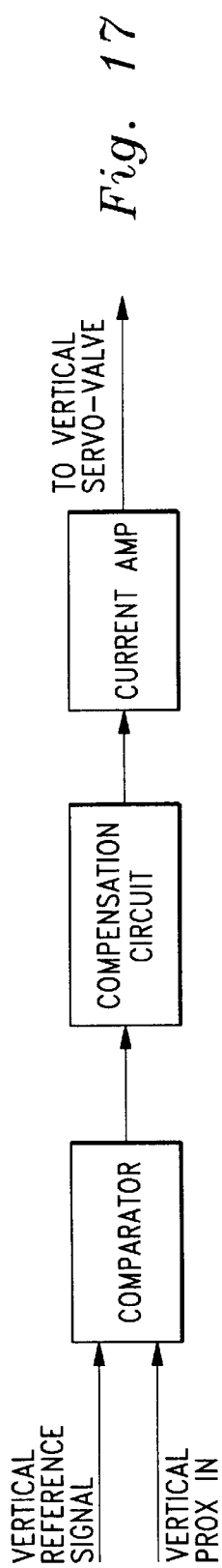
FIGS. 17 and 18 detail another form of the horizontal and vertical controller circuit.
Figure 18:
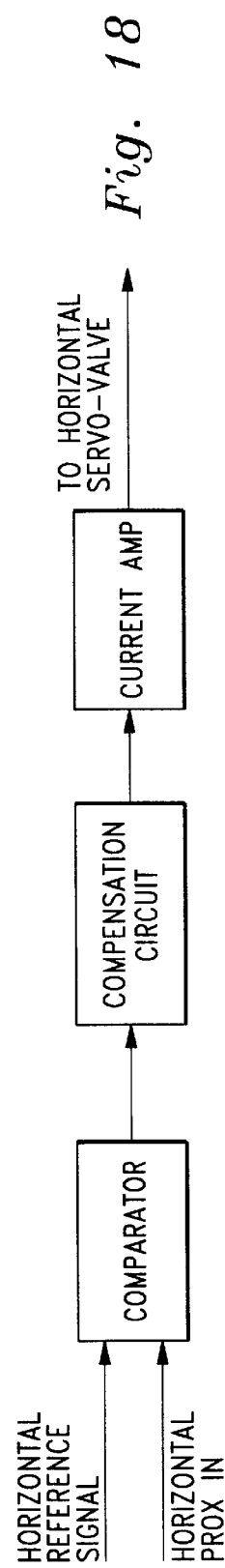
Figure 19:
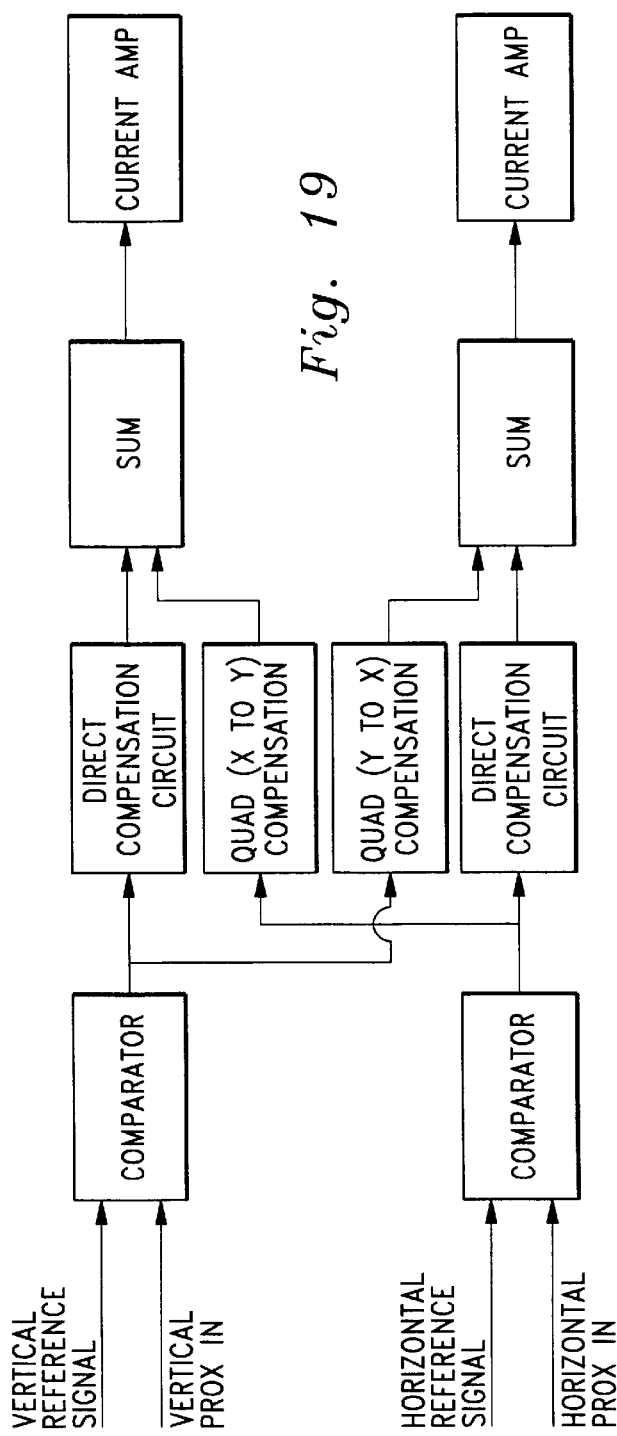
FIG. 19 details another form of the horizontal and vertical controller circuit.

FIGS. 17 and 18 detail a second form of the horizontal and vertical controller circuit. FIG. 19 details direct and quadrature compensation circuits as yet another form of the horizontal and vertical controller.

Figure 20:
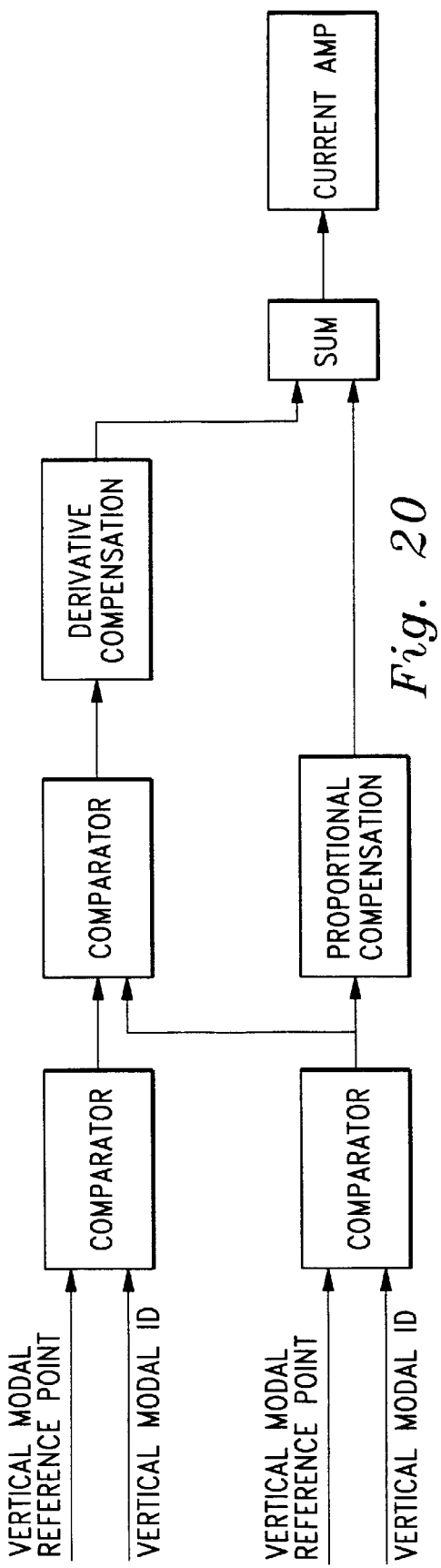
FIGS. 20 and 21 detail one form of a horizontal and vertical controller circuit for providing system modaling.
Figure 21:
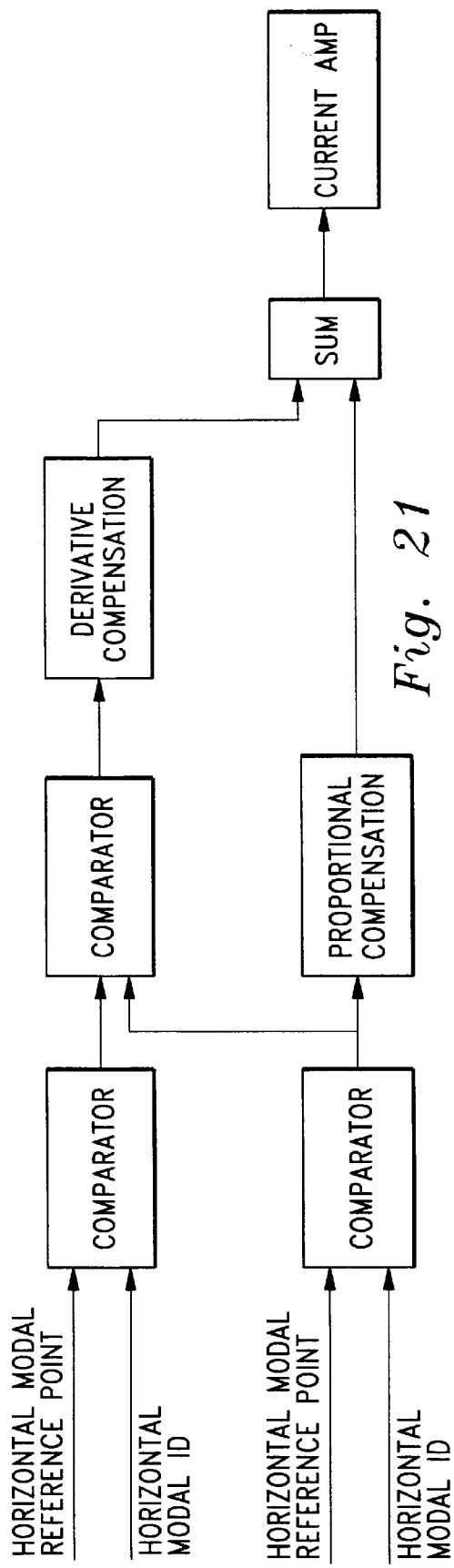

FIGS. 20 and 21 detail one form of a horizontal and vertical controller circuit for providing system modaling using, for example, and referring to FIG. 11, the modal probes 232, 234 adjacent the shaft remote from the bearing apparatus 12 and the second pair of modal probes 236, 238 (FIG. 23) disposed away from the bearing 14 and adjacent the shaft S to provide modal identification signals which characteristics of system resonances. Furthermore, differential expansion or motion transducers 206 can be operatively coupled to the controller circuit to measure the Z translation of the shaft S.

Figure 22:
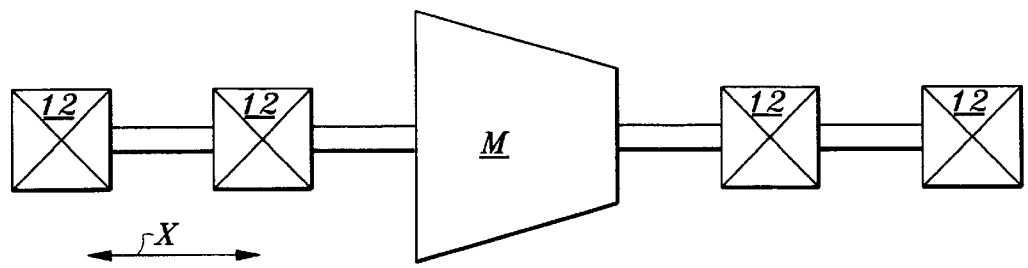
FIG. 22 is a schematic view of a pair of hydrostatic fluid bearings separated by an axial distance being disposed on sides of the shaft between which the load is imposed.

FIG. 22 shows an important implementation of the bearing system in the configuration of a pair of the hydrostatic fluid bearings being separated by an axial distance X disposed on each side of the shaft between which a load is imposed. The two narrowly separated bearings on both sides of the machine M tremendously increases the stiffness of the machine and therefore its stability.

Figure 24:
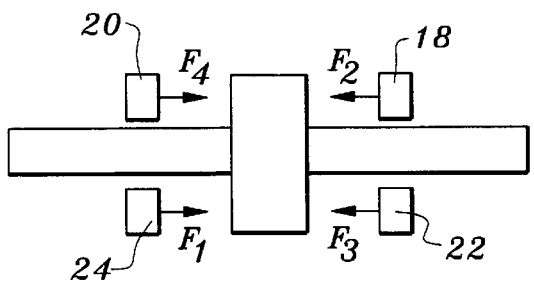
FIGS. 24, 25 and 26 are schematic views of how the hydrostatic fluid bearing apparatus according to the present invention can be used to provide fluid compensation to Z axial translation.
Figure 25:
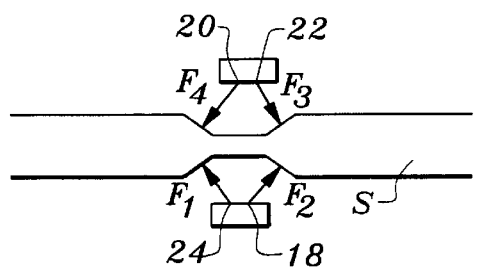
Figure 26:
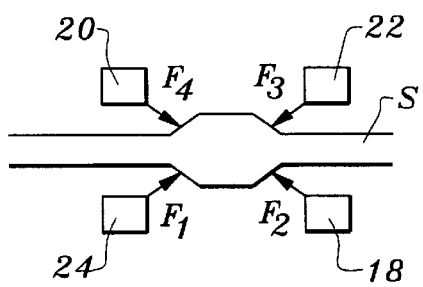

Further important implementation of the bearing system are shown in FIGS. 24, 25 and 26. These figures are schematic views of how the hydrostatic fluid bearing system according to the present invention can be used to provide fluid compensation for X, Y and Z axial. In FIG. 24 the fluidic forces in the axial or Z direction work on an element disposed on the shaft S. FIG. 25 shows the fluidic forces working on troughs disposed in the shaft to provide fluid compensation. In FIG. 26, the fluidic forces are shown working on ramps of the shaft to provide stability and alignment.

It should be noted that many of the machines M that are intended for use in this environment such as some pumps, operate in fluid baths. The instant invention is especially advantageous in an environment involving fluid baths since the same fluid that resides within the machine can be used as the fluid material to support the shaft within the bearing block 14. What this means in effect, is that seals and expensive fluid lubrication systems could be eliminated or reduced.

Moreover, having thus described the invention, it should be apparent that numerous structural modifications and adaptations may be resorted to without departing from the scope and fair meaning of the instant invention as set forth hereinabove and as described hereinbelow by the claims.

What is claimed is:

1. A fluid flow control system for a bearing, comprising in combination:
   a source of fluid;
   a flow regulator operatively extending between said source of fluid and said bearing;
   precession detecting and control means operatively coupled to a shaft circumscribed by said bearing, and
   diverter means interposed between said flow regulator and said bearing for controlling fluid flow in said bearing in response to signals received from said precession detecting and controls means.

2. The system of claim 1 further including an outlet line communicating with said source of fluid and said diverter means interposed therebetween for returning fluid to said source.

3. The system of claim 1 further including a pair of flow regulators operatively extending between said source of fluid and a pair of diametrically opposed bearing portals.

4. The system of claim 3 further including a pair of diverter means interposed between said pair of flow regulators and said diametrically opposed bearing portals.

5. The system of claim 4 further including means for coupling together said pair of diverter means for delivering a differential pressure to said portals.

6. A method for abating shaft precession with a fluid flow control system, the steps including:
   monitoring a shaft for precession,
   delivering a regulated flow of fluid in diametrically opposed streams to the shaft through portals of a bearing,
   determining whether the opposing streams should have pressure differentials, and
   modulating the diametrically opposed streams of fluid for delivering the differential pressure to the portals for abating shaft precession.

7. The method of claim 6 wherein monitoring the shaft for precession includes providing sensors to monitor a real time response signature of the shaft.

8. The method of claim 7 wherein determining whether the opposing streams should have pressure differentials includes comparing sensor output to a standard.

9. The method of claim 8 wherein modulating the diametrically opposed streams of fluid for delivering the differential pressure to the portals for abating shaft precession is based on sensor data.

10. The method of claim 6 wherein monitoring the shaft for precession further includes the step of monitoring dynamic position information of the shaft.

11. The method of claim 10 wherein monitoring the shaft for precession further includes the step of transforming said dynamic position information into control signals.

12. The method of claim 11 further including the step of utilizing the control signals for modulating the diametrically opposed streams of fluid for providing a dynamically proportioned fluid flow to control the passage of fluid through the portals to provide fluidic forces which react with the shaft to actively reduce machine vibration and provide stable shaft rotation.

13. A fluid flow control system for a bearing circumscribing a shaft, comprising in combination:
   a source of fluid;
   a first pair of flow regulators operatively extending upstream between said source of fluid and a first pair of diametrically opposed bearing portals disposed with said bearing;

a first diverter valve operatively extending downstream between said first pair of diametrically opposed bearing portals and said source of fluid;

precession detecting and control means operatively coupled to said shaft and to said first diverter valve for sensing shaft precession and manipulating said first diverter valve for delivering a differential flow of fluid through said first pair of portals to oppose shaft precession.

14. The system of claim 13 further including means disposed with said shaft for receiving fluidic pressure from a fluid directing means driven by said control means for providing axial compensation.

15. The system of claim 13 further including a second pair of flow regulators operatively extending upstream between said source of fluid and a second pair of diametrically opposed bearing portals disposed with said bearing which are circumferentially spaced from said first pair of diametrically opposed bearing portals.

16. The system of claim 15 further including a second diverter valve operatively extending downstream between said second pair of diametrically opposed bearing portals and said source of fluid.

17. The system of claim 16 wherein said precession detecting and control means is also operatively coupled to said second diverter valve for manipulating said second diverter valve for delivering a differential flow of fluid through said second pair of portals to oppose shaft precession detected by said precession detecting and control means.

18. A fluid flow control system for a bearing circumscribing a shaft, comprising in combination:

a source of fluid;

a first flow regulator operatively extending upstream between said source of fluid and a first pair of diametrically opposed bearing portals disposed with said bearing;

a first diverter valve operatively extending upstream between said first flow regulator and said first pair of diametrically opposed bearing portals;

precession detecting and control means operatively coupled to said shaft and to said first diverter valve for sensing shaft precession and manipulating said first diverter valve for delivering a differential flow of fluid through said first pair of portals to oppose shaft precession.

19. The system of claim 18 further including means disposed with said shaft for receiving fluidic pressure from a fluid directing means driven by said control means for providing axial compensation.

20. The system of claim 18 further including a second flow regulator operatively extending upstream between said source of fluid and a second pair of diametrically opposed bearing portals disposed with said bearing and circumferentially spaced from said first pair of diametrically opposed bearing portals.

21. The system of claim 20 further including a second diverter valve operatively extending upstream between said second flow regulator and said second pair of diametrically opposed bearing portals.

22. The system of claim 21 wherein said precession detecting and control means is also operatively coupled to said second diverter valve for manipulating said second diverter valve for delivering a differential flow of fluid through said seccond pair of portals to oppose shaft precession detected by said precession detecting and control means.

23. The system of claim 22 further including a third diverter valve operatively extending downstream between said first pair of diametrically opposed bearing portals and said source of fluid.

24. The system of claim 23 wherein said precession detecting and control means is also operatively coupled to said third diverter valve for manipulating said third diverter valve for modulating the delivery of fluid flow from said first diverter valve and through said first pair of portals to oppose shaft precession detected by said precession detecting and control means.

25. The system of claim 24 further including a forth diverter valve operatively extending downstream between said second pair of diametrically opposed bearing portals and said source of fluid.

26. The system of claim 23 wherein said precession detecting and control means is also operatively coupled to said forth diverter valve for manipulating said forth diverter valve for modulating the delivery of fluid flow from said second diverter valve and through said second pair of portals to oppose shaft precession detected by said precession detecting and control means.

27. A method for abating shaft precession with a fluid flow control system, the steps including:

monitoring a shaft for precession, driving a flow of fluid in diametrically opposed streams to the shaft through a first pair of portals of a bearing, determining whether the opposing streams should have pressure differentials, and modulating the diametrically opposed streams of fluid for delivering the differential pressure to the portals for abating shaft precession.

28. The method of claim 27 further including the step of driving a flow of fluid in diametrically opposed streams to the shaft through a second pair of portals of the bearing.

29. The method of claim 28 further including the step of determining whether the diametrically opposed streams of fluid to the shaft through the second pair of portals of the bearing should have pressure differentials.

30. The method of claim 29 further including the step of modulating the diametrically opposed streams of fluid to the shaft through the second pair of portals for delivering the differential pressure to the second pair of portals for abating shaft precession.

31. The system of claim 27 further including the steps of determining if the shaft needs axial compensation and directing fluid on a means disposed with said shaft for receiving fluidic pressure for providing necessary axial compensation.

* * * * *